United States Patent

[11] 3,581,043

[72] Inventors Werner Ullmann;
Costantino Tadini; Ehsan Salim, Locarno, Switzerland
[21] Appl. No. 743,362
[22] Filed July 9, 1968
[45] Patented May 25, 1971
[73] Assignee A. G. fur Industrielle Elektronik AGIE Locarno, Switzerland
[32] Priority July 11, 1967
[33] Switzerland
[31] 9820/67

[54] APPARATUS FOR THE CONTROL AND REGULATION OF THE WORK GAP OF AN ELECTROEROSION MACHINE
10 Claims, 7 Drawing Figs.
[52] U.S. Cl. .................................................. 219/69
[51] Int. Cl. ................................................. B23p 1/14
[50] Field of Search .......................................... 219/69 (G), 69 (F)

[56] References Cited
UNITED STATES PATENTS
2,927,191 3/1960 Matulaitis.................... 219/69(G)
3,435,176 3/1969 Lobur......................... 219/69(G)

Primary Examiner—R. F. Staubly
Attorney—Werner W. Kleeman

ABSTRACT: A circuit arrangement for the control and regulation of the width of a work gap of an electroerosion machine is disclosed. An electrical signal, the magnitude of which is indicative of the condition of the work gap, is fed to the input of a circuit arrangement which comprises a plurality of parallel switching stages, each responsive to different magnitudes of the electrical signal, the outputs of the circuit arrangement being at least partially coupled with a feed device for the work gap. A particular level of an electrical signal derived from the conditions of the work gap is associated with each of the switching stages. Hence, one switching stage responds to noload operation, in other words high voltage at the work gap, another stage to approximate short circuit conditions at the work gap, in other words, very low voltage at the work gap, and a further switching stage responds to normal operating conditions at the work gap.

APPARATUS FOR THE CONTROL AND REGULATION OF THE WORK GAP OF AN ELECTROEROSION MACHINE

BACKGROUND OF THE INVENTION

The present invention relates to an improved circuit arrangement for the control and regulation of the width of a work gap of an electroerosion machine formed by a tool electrode and a workpiece electrode, wherein the circuit arrangement, which has delivered to it an electrical magnitude as the input value of the work gap, is operably coupled with a subsequently arranged feed device.

Circuit arrangements are presently known which, in accordance with the physical conditions in the work gap, apply electric signals to a feed device and thereby move the tool electrode toward or away from the workpiece electrode. As a result of this displacement of the workpiece electrode, the width of the work gap is thus controlled and so regulated during the electroerosive working operation that the width remains constant as the erosion of material from the workpiece progresses. The component elements which have previously been employed for such control and regulating apparatus have all resembled one another in the sense that they respond either to electrical quantities, such as, for example, voltage, current, pulse length and pulse repetition frequency, or to hydraulic quantities of the electrolytic or dielectric liquids in the work gap, such as, for example, liquid pressure, rate of flow, temperature and degree of soiling. In accordance with these electrical or hydraulic states in the work gap, signals are generated and applied to a feed device. The feed device, which may consist of an electromotive drive comprising reduction gearing or an hydraulic oil drive, is controlled or regulated by these signals until the actual state existing in the work gap is identical with the desired nominal state set in the electroerosion machine. When these two states are in agreement, the action of the control and regulating arrangement on the feed device is terminated. Only when the actual state again deviates from the desired state are further signals applied to the feed device. However, because of the so-called "time lag" in the control and regulation of the feed device, these further signals do not so control or regulate the feed device, i.e. shift the tool electrode, as is theoretically necessary on the basis of the signal. The cause of this lag resides in the total mass of the tool electrode to be shifted and in the friction between the individual structural elements of the whole feed device which are to be shifted, including its control means. In the case of very heavy and large tool electrodes weighing, for example, 1,000 kilograms and more, this disadvantage of the "time lag" of the control and regulating installation has a very considerable effect on the feed device.

SUMMARY OF THE INVENTION

Thus, there remains a need in this art for an improved work gap regulating and control apparatus which overcomes the above prior art disadvantages. It is the primary object of the present invention to provide such an improved apparatus and, more specifically to clearly determine the existing operating conditions at the work gap and to deliver a defined and well differentiated command to the feed device controlling the size of the work gap. Further, more specific yet equally important objects of the subject invention are as follows:

a. to provide an apparatus for the control and regulation of the work gap which is highly sensitive to changes in the condition of the work gap;

b. to provide an apparatus for the control and regulation of the work gap which largely overcomes the "time lag" of the prior art; and c. to provide an apparatus for the control and regulation of the work gap which is highly stable and delivers defined commands to the feed device controlling the work gap.

These, as well as other objects and advantages, are implemented by the subject invention which is characterized by the features that the control circuit arrangement that is provided, incorporates parallel switching stages responsive to differing values of an electrical magnitude or signal, the outputs of the control circuit arrangement being at least partially connected to a feed device.

The apparatus according to the invention may be employed both in the erosion of material by sparking with the dielectric liquid in the work gap and in the electrolytic erosion of material (without sparking) with the electrolytic liquid in the work gap.

BRIEF DESCRIPTION OF THE DRAWINGS

The invention itself as well as further advantageous features thereof will be better understood when attention is directed to the following detailed description of preferred embodiments thereof, such descriptions to be read in conjunction with the appended drawings, wherein.

DETAILED DESCRIPTION OF THE PREFERRED EMBODIMENTS

Figure 1:
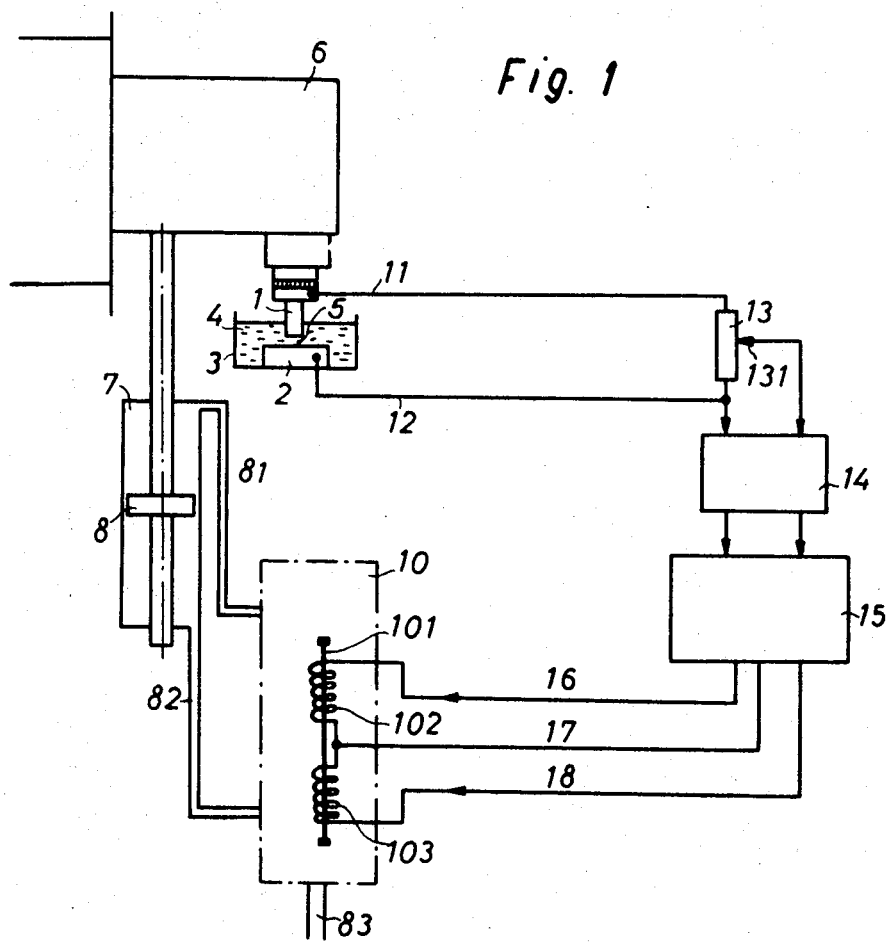
FIG. 1 diagrammatically illustrates an embodiment in the case of a feed device having a hydraulic drive.

In FIG. 1, the tool electrode 1 and the workpiece electrode 2 are disposed in a receptacle 3 containing a dielectric or electrolytic liquid 4, and define a work gap 5. The work head 6 of a feed device shifts the electrode 1 in its position in relation to the workpiece 2, which is worked by sparking or electrolytically. Provided in the cylinder 7 is a piston 8 which moves a work head 6 upwards or downwards, in accordance with a hydraulic pressure, the work head 6 being displaceably mounted in the machine frame 9, whereby the position of the electrode 1 in relation to the workpiece 2 is adjusted. The direction of movement of the work head 6 depends upon whether the hydraulic pressure medium is introduced into the cylinder 7 through the inlet channel 81 or through the inlet channel 82. The control for this purpose takes place by means of the electromagnetic servo-valve 10, whose control piston 101 is moved in one direction or the other by the coils 102, 103. The admission and discharge duct is designated 83 and is connected to the reservoir for the pressure medium and to the pressure pump. These details of the hydraulic installation, being well known, are not shown with particularity.

In the following, the electrical control and regulation of the arrangement so far described will be dealt with. A tap is provided at the work gap 5. This tap may include both the electrical quantities, for example, voltage, current, pulse length, pulse repetition rate, and the hydraulic quantities, for example, liquid pressure, rate of flow, temperature etc., in the work gap 5. It is initially determined in each particular case which quantity of the electrical or hydraulic parameters in the work gap is to be produced for controlling and regulating the feed of the tool electrode 2. In the present embodiment of FIG. 1, the operating voltage (spark voltage) in the work gap has been chosen as parameter. However, it is to be expressly understood that other parameters can be utilized as the controlled or regulated variable. The two conductors 11, 12 are connected to the tool electrode 1 and to the workpiece electrode 2. The voltage thus tapped passes to a variable potentiometer 13, from which a reduced voltage is tapped by means of the movable tap 131 and applied to the filter 14. The filter is intended to convert the pulse-form work gap voltage into a corresponding unidirectional voltage. The details of the filter 14 will hereinafter be more fully described.

The unidirectional voltage referred to above passes to the sequentially short circuit device 15 according to the invention. The device, which is constructed as a discontinuous amplifier, comprises substantially a number of switching stages. A particular level of the work gap voltage is associated with each of the switching stages. Thus, one switching stage is adapted to respond to high voltage, another to medium voltage and a further one to low voltage. However, the values of the individual voltages differ from one another only to such an extend that one switching stage becomes operative at no-load operation, i.e. high voltage at the work gap, no passage of current through the electrolytic or dielectric liquid, and the other stage at the approximate short circuit, i.e. very low voltage at the work gap, very high passage of current through the liquid. The third switching stage becomes operative only at normal metal working, i.e. voltage and current in the work gap at normal levels. In the third switching stage, which acts on the drive 10 of the feed device 6, 7 and 8, under normal conditions or in the "state of equilibrium," there is provided an oscillator which emits oscillations at a particular frequency in a central position. There is thus produced an artificial, unstable behavior of the drive 10 of the feed device during normal working. The discontinuous amplifier 15, whose outputs are connected to the electromagnetic coils 102, 103 of the servovalve 10 through the conductors 16, 17 and 18, operates as follows: when no electroerosive working is taking place (no-load), the electromagnetic coil 102 is actuated through the conductors 16, 17, so that a pressure medium flows out of the duct 83, through the actuated control piston 101 and into the duct 81, and thus into that part of the cylinder 7 which is situated above the piston 8. The work head 6 and the electrode 1 then move in the direction of the workpiece 2. As soon as the work gap 5 has become so small that a spark discharge takes place through the liquid, the work gap voltage acquires a normal value. In this case, the two electromagnetic coils 102, 103 alternatively receive current at a particular frequency through the conductors 16, 17 and 18. The control piston 101 of the servovalve 10 thus receives a vibration of the same frequency. The pressure medium thus passes alternately through the supply duct 81 and the supply duct 82 into the upper and lower parts, respectively, of the cylinder 7. However, since the control piston 101 only undergoes very small control deflections, the pressure fluctuations of the medium in the cylinder 7 are so small that the electrode 1 is scarcely vibrated, if at all. This is connected with the total mass, or the weight of the feed arrangement. When the conditions resembling a short circuit arise and the work gap voltage becomes very low, the electromagnetic coil 103 receives current from the amplifier 15 through the conductors 17, 18. The pressure medium is passed out of the duct 83 by the actuated control piston 101, through the supply duct 82 and into the lower part of the cylinder 7. The work head 6 and the electrode 1 then move away from the workpiece. This continues until the normal working state in the work gap has been restored.

During the normal working operation, therefore, the drive 10 is set in "vibration" about a central position by the artificially produced unstable action of one switching stage, without the work head 6 and the electrode 1 also being vibrated. Because of the unstable action of the drive 10, the whole feed device very rapidly responds with great sensitivity to signals which are emitted by the amplifier 15 in nonnormal cases of working, i.e. no-load running or conditions resembling a short circuit.

Figure 2:
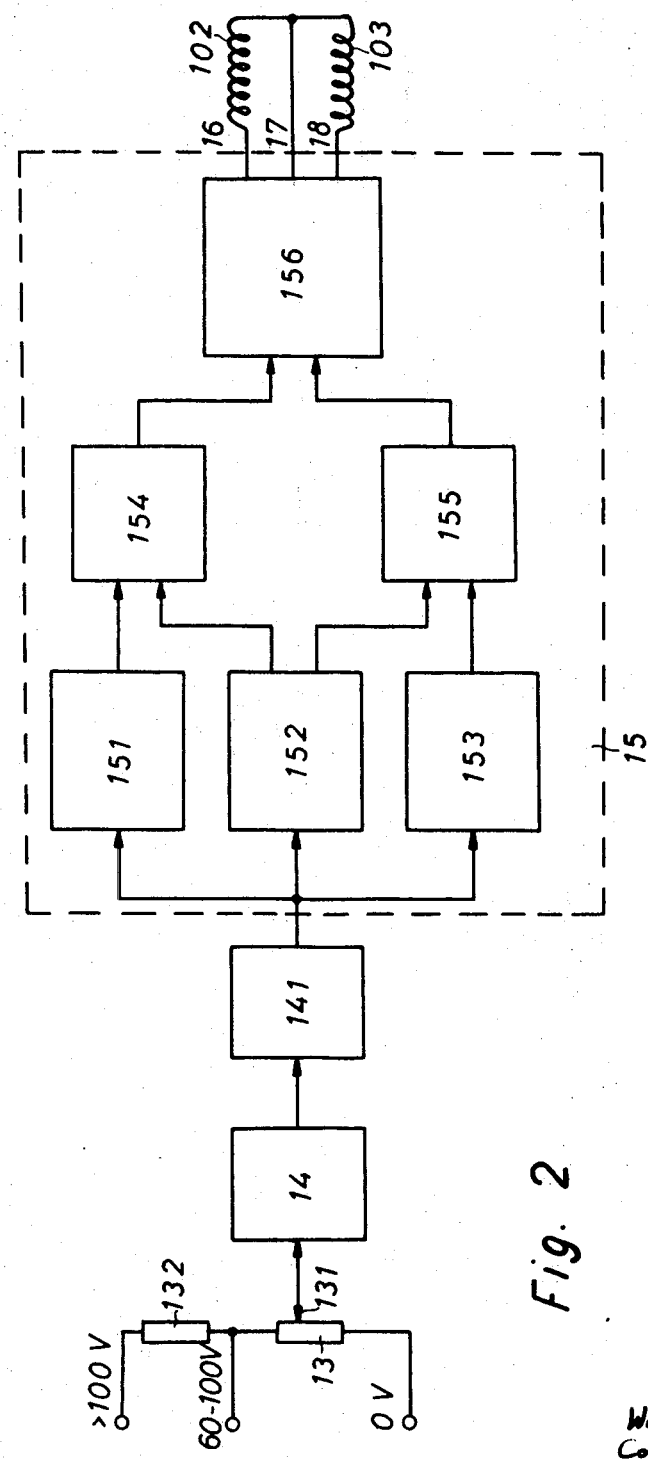
FIG. 2 illustrates the whole electrical circuit arrangement in the form of a block diagram.

FIG. 2 illustrates in detail what has so far been discussed. The work gap voltage reduced to a particular value is tapped from the potentiometer 13 by means of the tap 131. A further resistor 132 is also provided for the case where the work gap voltages may reach a value higher than 100 volts. Between these two resistors, there is provided a center tap which is also attached to the electrode 1. This center tap serves for voltages between 60 and 100 volts. The lower end of the potentiometer 13 is attached to the workpiece 2. As already described in the foregoing, the filter 14 is connected to the tap 131. The manner of operation of the filter 14 has already been described with reference to FIG. 1. The filter 14 is followed by an emitter-follower amplifier 141, which will be more fully described below. The essential component parts of the discontinuous amplifier 15 connected thereto is more fully illustrated. For each voltage value, a separate switching stage 151, 152 and 153 is provided. As will hereinafter be more fully explained, each of these switching stages constitutes a so-called Schmitt trigger. The inputs of these Schmitt triggers 151, 152 and 153 are connected in parallel with one another and are connected to the output of the amplifier 141. For example, the Schmitt trigger 151 is set for a unidirectional voltage level of 5 to 8 volts (upper level). This voltage level is adjustable to a particular value in this range. The Schmitt trigger 152 is set to a unidirectional voltage level of 4 volts (equilibrium level). The Schmitt trigger 153 is set to a unidirectional voltage level of 2.5 volts. Depending upon the level of the work gap voltage, the switching stage 151, 152, or 153 responds. While the switching stage 151 responds to no-load conditions in the work gap and the switching stage 153 to conditions resembling a short circuit in the work gap, the switching stage 152 is actuated when the working conditions in the work gap are normal.

The outputs of the switching stage 152 are connected to the succeeding summating arrangements 154, 155. The switching stage 151 is connected only to the summating arrangement 154 and the switching stage 153 only to the summating arrangement 155. In the summating arrangements 154, 155 the voltage signals from the stages 151, 152 and 153 are added. This will be more fully described in the following: the differential amplifier 156, which is connected to the outputs of the arrangement 154, 155, thus receives either the voltage signal from the switching stage 151 under no-load conditions in the work gap 5, or the voltage signal from the switching stage 153 when conditions resembling a short circuit exist in the work gap 5. In accordance with these signals, the differential amplifier 156 actuates either the coil 102 or the coil 103 of the servovalve 10. Consequently, the control piston 101 of the servovalve is shifted in one direction or the other. When the values of the work gap voltage continuously change in accordance with the movement of the tool electrode 1 in relation to the workpiece 2, voltage values are set up at which not only one, but two switching stages, for example 151 and 152 or 153 and 152, respond. In such a case, the differential amplifier 156 receives from the summating arrangements 154 or 155 the added voltage values from the two switching stages. An ultra-fine regulation of the electromagnetic coil 102 or 103 of the servovalve 10 is thereby possible. As already described with reference to FIG. 1, the feed device is shifted in one direction or the other by means of the piston 8. When the operating conditions in the work gap are normal, only the switching stage 152 is operative and it then applies cyclically recurring signals to the coils 102, 103 through the summating arrangements 154, 155 and the differential amplifier 156 by way of the conductors 16, 17 and 18. This therefore results in a continuous "vibration" of the control piston 110 of the servovalve 10. A detailed description of this feature has already been given with to TO FIG. 1 and need not be repeated here.

Figure 3:
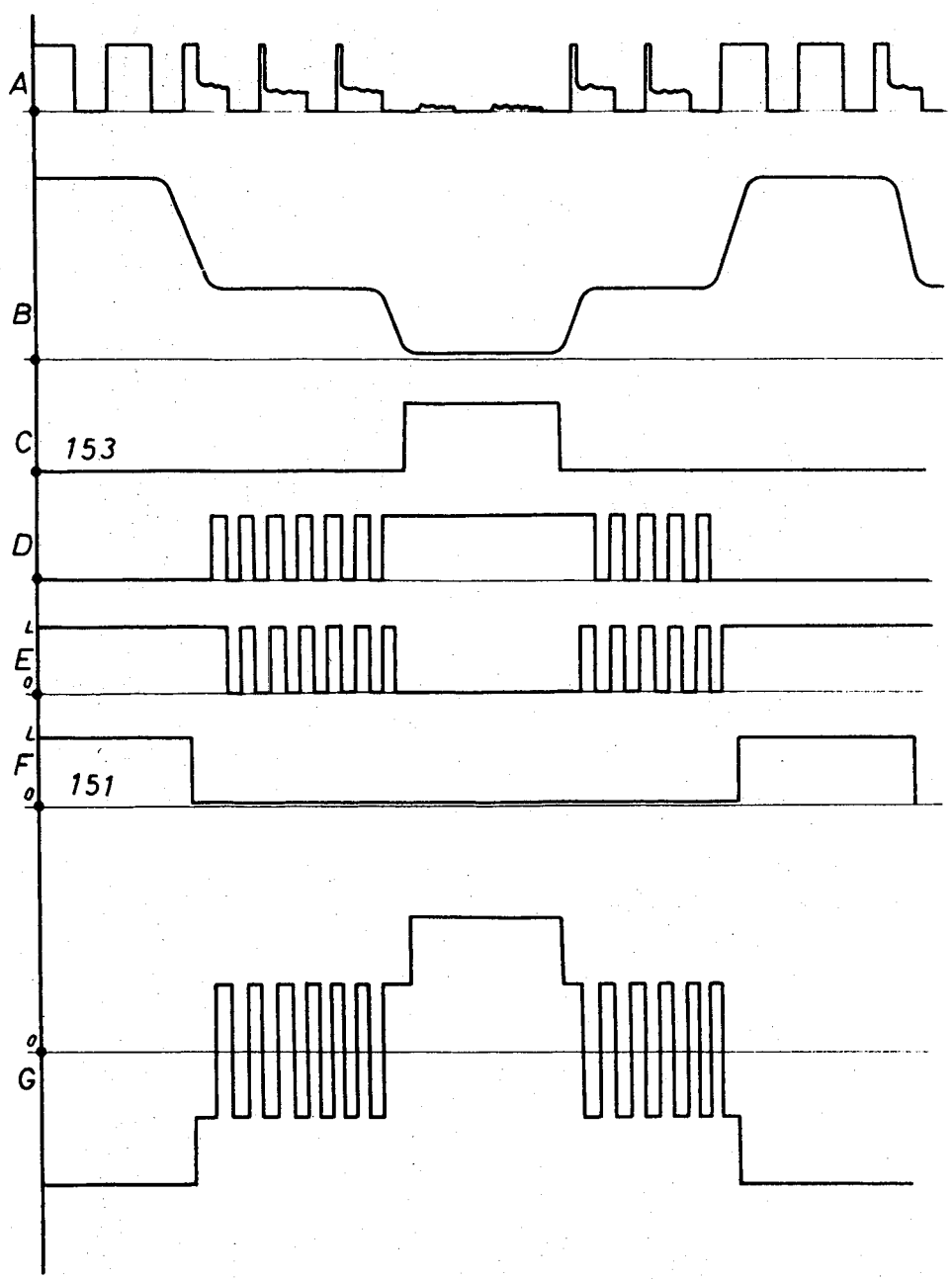
FIG. 3 is a diagram illustrating the manner of operation of the embodiment of FIGS. 1 and 2.

FIG. 3 diagrammatically illustrates the manner of operation of the whole arrangement described with reference to FIGS. 1 and 2. The working pulses in the work gap 5 are represented by A. The first two are absolute no-load pulses. The succeeding three pulses have the form of normal working pulses. The next two represent a case of a short circuit. There then follow, for the sake of illustration, two normal working pulses, thereafter two no-load pulses and then again a normal working pulse. Below this, at B, is a curve representing the unidirectional-voltage trend which is present after the filter 14. In the case of the first two no-load pulses, the filter voltage is also the highest. The filter voltage falls to a particular value at normal working pulses. As soon as the short circuit has occurred in the work gap 5, the voltage after the filter falls approximately to zero. When the short circuit is removed and the normal working state exists in the work gap 5, the voltage at the output of the filter 14 accordingly rises again and becomes even higher during no-load. In the curve C below this, the voltage level of the Schmitt trigger 153 (lower level starting at a unidirectional voltage of 2.5 volts) has been plotted. It is clearly apparent that in the event of a short circuit in the work gap 5 the Schmitt trigger 153 undergoes a voltage increase at its output. This voltage increase is applied through the arrangement 155 to the differential amplifier 156, where it renders operative, through the conductors 17, 18, the electromagnetic coil 103 of the servovalve 10 and thus moves the feed arrangement by way of the piston 8 in such manner that the electrode 1 moves away from the workpiece 2.

In curves D, E of FIG. 3, there are plotted the pulses three the Schmitt trigger 152 applies to the summating arrangements 154, 155 as soon as normal pulse conditions are present in the work gap 5 (see curve A). In the event of a clear case of no load or a clear case of short circuit, these oscillations are interrupted. This will be seen from a comparison of curve A with curves D, E. In the curve F plotted below this, there is plotted the voltage signal set up at the output of the Schmitt trigger 151 (upper level, 5—8 volts regulatable). A comparison of curves A and F will show that this Schmitt trigger responds only when no-load conditions exist in the work gap 5. The curve G shows the added voltage signals from the THREE switching stages 151, 152 and 153, which arrive at the differential amplifier 156 from the arrangements 154, 155. The oscillations from the Schmitt trigger 152 (equilibrium level, 4 volts) are summated additively and subtractively. The voltage curve from the Schmitt trigger 153 for cases similar to a short circuit is always higher than the oscillations from the Schmitt trigger 152. This means, therefore, that when a short circuit occurs the feed device particularly rapidly moves the electrode 1 away from the workpiece 2. The absolute value of the output voltage from the Schmitt trigger 151 for the case of no-load in the work gap 5 is added to the voltage oscillations of the Schmitt trigger 152, on the opposite side to the voltage from the Schmitt trigger 153. A clear separation is thus obtained between the individual signals applied to the differential amplifier 156, so that even in the case of continuous, slow variations of the work gap voltage the differential amplifier 156 can apply discrete and independent signals through the conductors 16, 17 and 18 either to the coil 102 or the coil 103 or to both coils. These accurately distinguishable signals are present despite the fact that the Schmitt trigger 152 has an artificially detuned range in which the servovalve reciprocates and in which the servovalve is undefineable in its control property.

Figure 4:
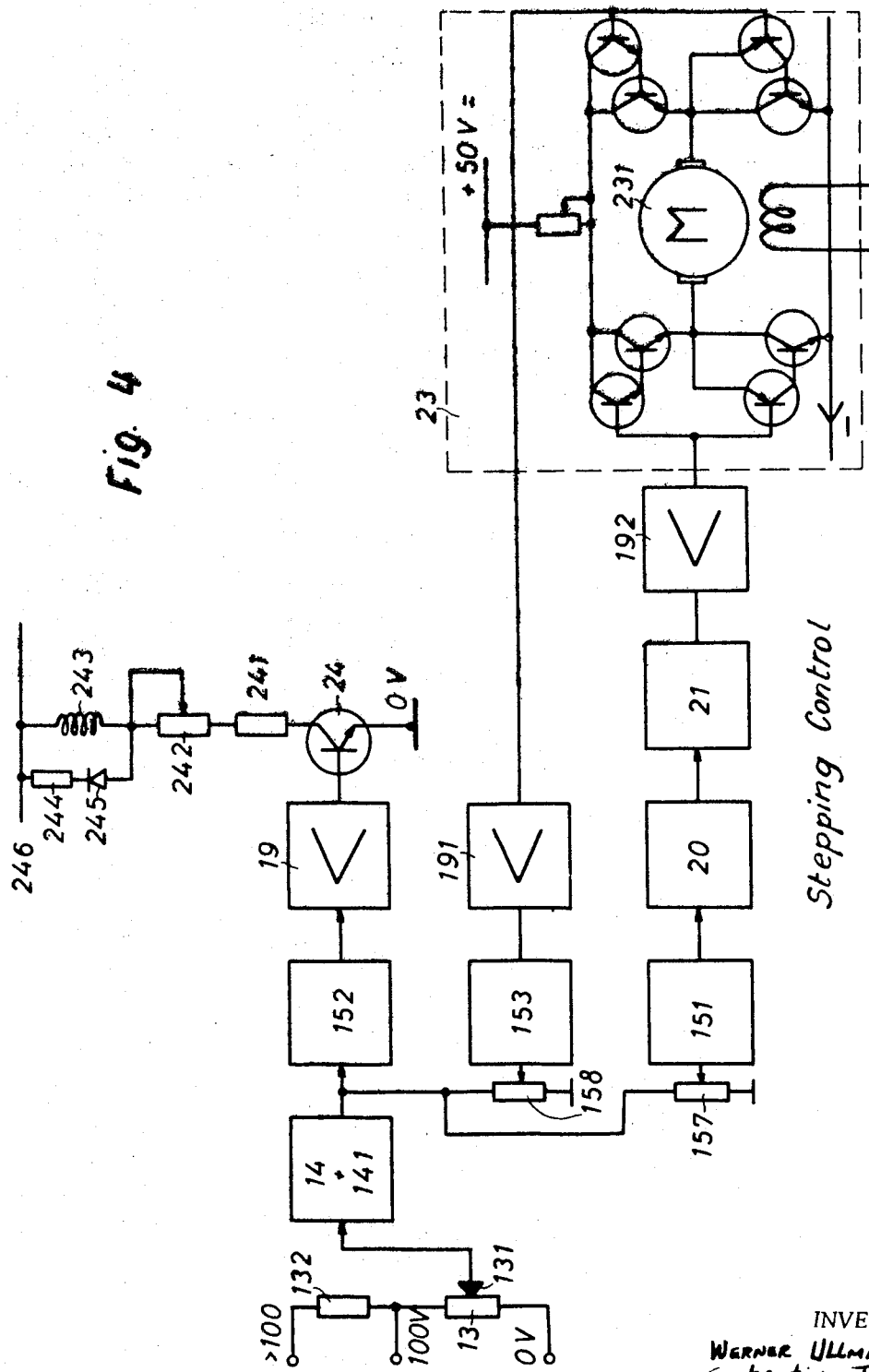
FIG. 4 is a block diagram of an embodiment in the case of a feed device having an electromotive drive.

FIG. 4 illustrates a further application to the control and regulation of the work gap width with electromotive drive of the feed device and with simultaneous use of a vibrator for the electrode during normal electroerosive working. A further resistor 132 is connected to the potentiometer 13. The taps for voltages higher than 100 volts, for 100 volts and for 0 volt are connected to the electrode 1 and to the electrode 2 respectively as already described. The work gap voltage, reduced to a predetermined value, passes through the tap 131 of the potentiometer 13 to the filter 14 and to the amplifier 141. The Schmitt triggers 151, 152 and 153 are provided at the latter. The Schmitt trigger 151, which responds to no-load conditions in the work gap 5, is set, for example, to a response voltage of 5 volts by the series-connected variable resistor 157. Through a so-called step-by-step control consisting of a pulse generator 20 and an astable multivibrator 21, pulses are applied at a repetition rate of 5 c/s with a pulse length of 50 milliseconds to the amplifier 192 and to the current amplifier 23 for the electromotive drive of the feed device. When the Schmitt trigger 151 has responded because of no-load conditions in the work gap, the motor 231 is controlled stepwise. The Schmitt trigger 153, which is set to a response voltage of 2.5 volts through the potentiometer 158 (conditions resembling a short circuit in the work gap), applies a continuous voltage to the amplifier 191 and further to the current amplifier 23 for the motor 231. The motor 231 moves continuously in the other direction and moves the electrode 1 away from the workpiece 2.

Under normal working conditions in the work gap 5, the Schmitt trigger 152 responds to a unidirectional voltage of 4 volts. As already stated with reference to the previous FIG., this Schmitt trigger applies pulses to the amplifier 19 and brings the transistor 24 into the conductive or nonconductive state at the same frequency. The circuit which is connected to the collector of the transistor 24 and which consists of the resistors 241, 242, the diode 245 and the resistor 244, belongs to the vibrator coil 243. Since the transistor is maintained at a potential of 0 volt at its emitter electrode, it switches the vibrator coil 243 through the arrangement just described, which is connected to a normal supply voltage 246. The vibrator coil 243 actuates the electrode 1 in such manner that the electrode is vibrated. Since the Schmitt trigger 152 oscillates at a frequency of 200 c/s. the electrode 1 is also vibrated at 200 c/s through the coil 243. Because of the vibrations of the electrode 1, the waste products resulting from the erosion of the material from the workpiece 2 are more satisfactorily eliminated. As soon as conditions resembling a short circuit or the no-load state have been set up in the work gap 5, the vibration of the electrode ceases and the Schmitt trigger 153 or 151 become operative to control the motor drive 231. The motor drive 23 is well known and consists of eight switching transistors for actuating the rotor of the motor 231 in one direction or the other. No further details will be given in this respect, because they can be found in any standard text book and do not form a part of the invention.

Finally, it is to be noted that the arrangement of FIG. 1 makes it possible to employ the vibrator for a rapid regulation of the whole system and to employ the motor drive for the slow regulation. This is possible because the speed of displacement of the vibrator is sufficiently high, namely 0.5 mm. per millisecond. Consequently, the whole system is substantially more stable. This results in a better removal of the waste products from the work gap. Moreover, the wear of the electrode 1 is substantially lower and the roughness of the worked surface on the workpiece 2 is much more favorable.

Figure 5A:
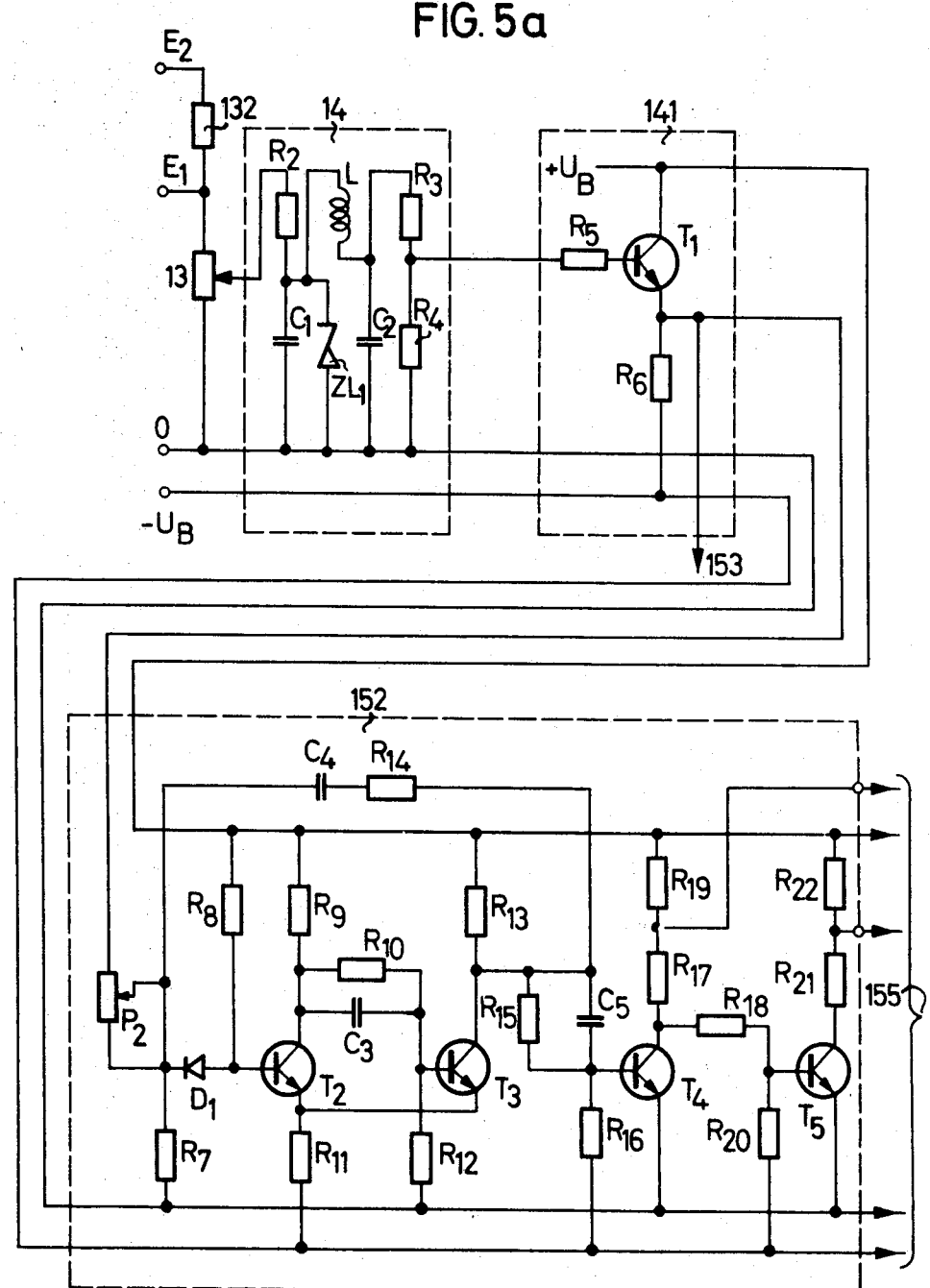
FIG. 5 illustrates the detail of the circuit arrangement.
Figure 5B:
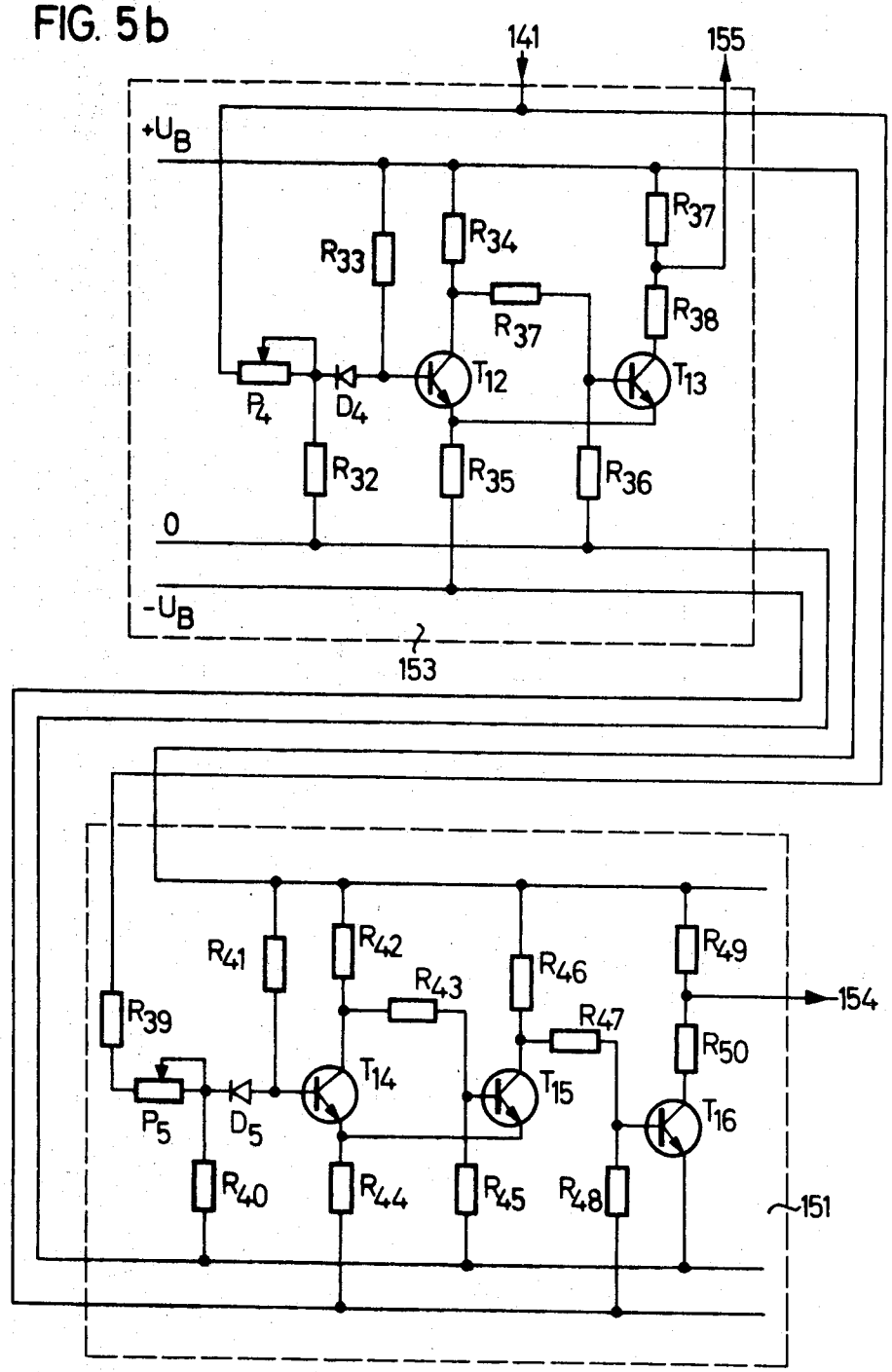
Figure 5C:
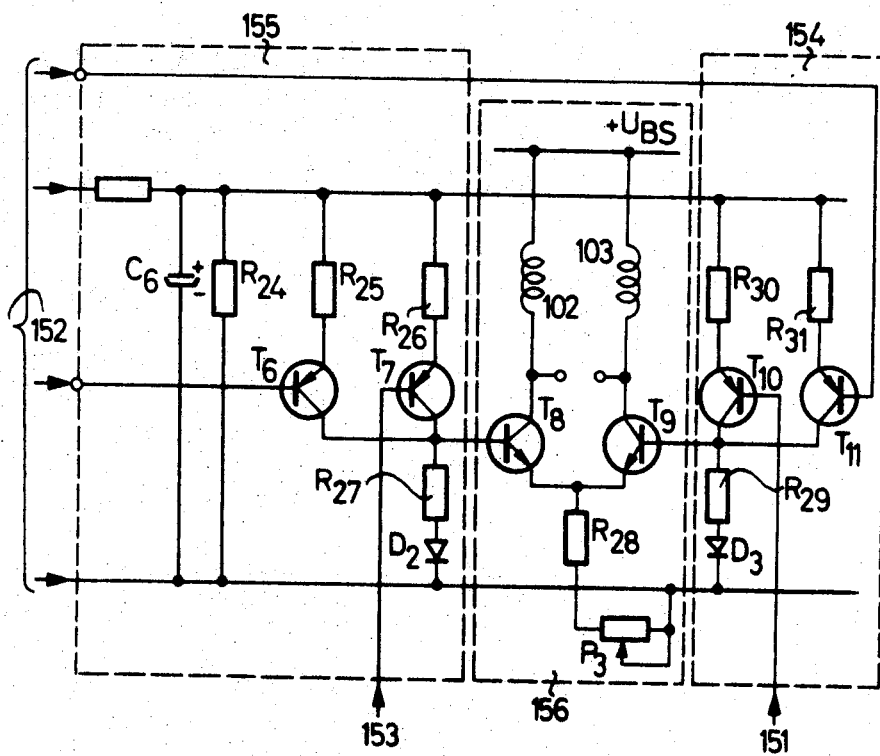

FIG. 5 shows in detail the exact arrangement of the various component elements in the discontinuous amplifier 15. The spark gap voltage existing in the momentary condition is tapped from the electrodes E2, E1, 0 and applied to the input resistor R2 in the filter 14 through the potentiometer 13 by means of the tap 131, or through the resistor 132. The arrangement of the capacitors C1, C2 in relation to the inductance L and to the resistors R3, R4 is such as to supply a limiting frequency of 250 c/s. The pulses of the work gap voltage at higher frequency set up a corresponding unidirectional voltage at the output of the filter 14. The Zener diode ZL1 prevents the passage of voltages higher than 10 volts. In this way, the succeeding transistor T1 in the emitter-follower amplifier 141 is protected. This emitter amplifier is followed by the Schmitt triggers 151, 152, and 153. The Schmitt trigger 151, the Schmitt trigger 152 and the Schmitt trigger 153 are adjusted to the voltage levels through the input potentiometer P5, the input potentiometer P2 and the input potentiometer P4 respectively, as already described with reference to the previous figures. The Schmitt trigger 152 consists of the two transistor stages T2, T3 and T4, T5 with the correspondingly arranged resistors R7 to R22, the capacitors C3, C4, C5 and the diode D1. Due to this particular construction of the Schmitt trigger 152, which is set in operation when normal voltage conditions exist in the work gap 5, as already mentioned, a so-called negative hysteresis is obtained. A quasistable state is thereby obtained, in which this Schmitt trigger oscillates, and applies its oscillations to the hydraulic drive of the feed device. The oscillation frequency is approximately 200 c/s. Depending upon the manner in which the feed device is driven, this number of oscillations may be changed. The other two Schmitt triggers 151, 153, which respond to the upper level or the lower level of the work gap voltage as already mentioned, are so designed that when normal working conditions exist in the work gap continuous voltages are applied to the differential amplifier 156. The Schmitt trigger 151 consists of a transistor stage T14–T16 with the associated resistors R39–R50 and the diode D5. The Schmitt trigger 153 consists of the transistor stage T12, T13 with the corresponding resistors R32–R38 and the diode D4.

While one output between the resistors R17 and R19 of the Schmitt trigger 152 is connected to the transistor T11 of the summating arrangement 154 and the second output of the Schmitt trigger 152 between the resistors R21 and R22 is connected to the transistor T6 of the summating arrangement 155, the Schmitt trigger 151 is connected by the output between the resistors R49, R50 to the transistor T10 of the summating arrangement 154, and the output between the resistors R37 and R38 of the Schmitt trigger 153 is connected to the transistor T7 of the summating arrangement 155. The construction of the summating arrangements 154, 155 from the aforesaid transistors with the resistors R23 to R27 and R29 to R31, and also the diodes D2 and D3 with the electrolytic capacitor C6, is so effected that the addition of the various voltage values takes place in accordance with FIG. 3, curve G. The result of this addition is applied to the transistors T8 and T9 of the differential amplifier 156. The drive of the feed device is, in this case, effected by the electromagnetic coils 102, 103 of the servovalve 10.

It should now be apparent that the objects set forth at the outset of this specification have been successfully achieved.

We claim:

1. A circuit arrangement for the control and regulation of the width of the work gap of an electroerosion machine formed by a tool electrode and a workpiece electrode, said circuit arrangement comprising: means for developing an electrical signal having a magnitude representative of the conditions at the work gap, circuit means comprising a plurality of parallel switching stages each responsive to differing magnitudes of said electrical signal, one of said switching stages only being responsive to a first magnitude of said electrical signal indicative of no-load conditions at the work gap, another of said switching stages only being responsive to a second magnitude of said electrical signal indicative of approximate short-circuit-type conditions at the work gap, and still a further switching stage only being responsive to a third magnitude of said electrical signal indicative of normal operating conditions at the work gap, said switching stages thus delivering clearly differentiable command signals to feed means for controlling the width of the work gap, and feed means for controlling the width of the work gap, said feed means being at least partially coupled with the outputs of said circuit means to receive said clearly differentiable command signals from said switching stages.

2. Apparatus according to claim 1, further including summating means, and wherein said switching stages are connected in parallel with one another on the input side thereof and adapted to respond to predetermined differing voltage values defining said first, second and third magnitudes of said electrical signal, said switching stages being connected in at least two pairs on the output side thereof to said summating means, with one of said switching stages being common to said two pairs, each pair of switching stages exhibiting the minimum difference in voltage values.

3. Apparatus according to claim 2, further including differential amplifier means and drive means for said feed means, said differential amplifier means being connected on the output side of said summating means, said differential amplifier means actuating said drive means.

4. Apparatus according to claim 1, further including a potentiometer means provided at the input of at least some of said parallel switching stages, said potentiometer means adjusting the voltage threshold value of response of said respective switching stages, said voltage threshold value of response being within the range from 0 to 10 volts.

5. Apparatus according to claim 1, wherein said feed means for the work gap comprises a mechanical feed device reversibly controlled by at least one electric motor, two of said plurality of switching stages having their outputs connected to said mechanical feed device, said apparatus further including a vibrator arrangement having a coil, and a further one of said plurality of parallel switching stages having its output side connected to said coil.

6. Apparatus according to claim 5, further including a controllable semiconductor means connected between said further one of said plurality of switching stages and said coil of said vibrator arrangement.

7. Apparatus according to claim 5, wherein one of said plurality of switching stages is connected to said electric motor of said feed device and incorporates a step-by-step control on its output side.

8. Apparatus according to claim 1, wherein each of said plurality of parallel switching stages adapted to respond to differing voltage levels comprises a Schmitt trigger, one Schmitt trigger being set to the value of no-load voltage at the work gap, another of said Schmitt triggers being set to the value of the operating voltage of the work gap, and a further one of said Schmitt triggers being set to the value of the short circuit voltage at the work gap.

9. Apparatus according to claim 8, wherein said Schmitt triggers which are adapted to respond to the no-load and short circuit voltage at the work gap have a unidirectional-voltage signal as their outputs, said Schmitt trigger which is set to the normal operating voltage of the work gap having an output comprising a pulse train of predetermined repetition rate.

10. Apparatus according to claim 8, wherein each of said Schmitt triggers consist of transistorized units, said Schmitt trigger responsive to the value of the operating voltage comprising two transistor stages.